United States Patent
Hancock et al.

(10) Patent No.: US 9,776,626 B2
(45) Date of Patent: Oct. 3, 2017

(54) HYBRID ELECTRIC VEHICLE CONTROLLER AND METHOD OF CONTROLLING A HYBRID ELECTRIC VEHICLE

(75) Inventors: Matthew Hancock, Whitley (GB); Javier Villegas, Whitley (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 222 days.

(21) Appl. No.: 13/983,239

(22) PCT Filed: Jan. 31, 2012

(86) PCT No.: PCT/EP2012/051487
§ 371 (c)(1),
(2), (4) Date: Oct. 15, 2013

(87) PCT Pub. No.: WO2012/104267
PCT Pub. Date: Aug. 9, 2012

(65) Prior Publication Data
US 2014/0032026 A1 Jan. 30, 2014

(30) Foreign Application Priority Data
Feb. 1, 2011 (GB) .................................. 1101705.0

(51) Int. Cl.
*B60L 9/00* (2006.01)
*B60L 11/00* (2006.01)
(Continued)

(52) U.S. Cl.
CPC ............ *B60W 20/20* (2013.01); *B60W 10/02* (2013.01); *B60W 10/06* (2013.01); *B60W 10/08* (2013.01);
(Continued)

(58) Field of Classification Search
CPC ...... B60W 20/20; B60W 10/02; B60W 10/06; B60W 10/08; B60W 10/113; B60W 30/19
(Continued)

(56) References Cited

U.S. PATENT DOCUMENTS 5,815,824 A 9/1998 Saga et al.
5,842,534 A 12/1998 Frank
(Continued)

FOREIGN PATENT DOCUMENTS

CN 101066674 A 11/2007
DE 102007050230 A1 4/2009
(Continued)

OTHER PUBLICATIONS

International Search Report for PCT Application No. PCT/EP2012/051487 mailed Jul. 10, 2012; 4 pages.
(Continued)

*Primary Examiner* — Mahmoud Ismail
(74) *Attorney, Agent, or Firm* — Myers Bigel, P.A.

(57) ABSTRACT

Embodiments of the invention provide control means for a hybrid electric vehicle (HEV) operable to control first and second actuators of a vehicle to deliver motive torque to drive a vehicle, the control means being operable to control a vehicle to transition between a first mode in which a first actuator is substantially disconnected from a driveline of a vehicle and a second actuator delivers motive torque to drive a vehicle and a second mode in which a first actuator is connected to a driveline by means of a releasable torque transmitting means and the control means controls first and second actuators to deliver respective first and second actuator target torque split values to drive a vehicle thereby to provide a driver demanded drive torque, when a transition from the first mode to the second mode is required the control means being configured to control rotation of a first
(Continued)

actuator by means of a speed control means towards a target first actuator speed and to control a releasable torque transmitting means to transition between an actuator disconnected condition and an actuator connected condition thereby to connect a first actuator to a driveline, the control means being further configured to ramp an amount of torque delivered by a first actuator towards a first actuator target torque split value, and to ramp an amount of torque delivered by a second actuator towards a second actuator target torque split value while retaining a total drive torque value provided to a vehicle substantially equal to a driver demanded torque, wherein the target first actuator speed is a speed greater than a speed at which a first actuator would rotate with a releasable torque transmitting means in the actuator connected condition.

14 Claims, 4 Drawing Sheets

(51) Int. Cl.

| | | |
|---|---|---|
| *G05D 1/00* | (2006.01) | |
| *G05D 3/00* | (2006.01) | |
| *G06F 7/00* | (2006.01) | |
| *G06F 17/00* | (2006.01) | |
| *B60W 10/02* | (2006.01) | |
| *B60W 10/08* | (2006.01) | |
| *B60W 20/20* | (2016.01) | |
| *B60W 10/06* | (2006.01) | |
| *B60W 20/00* | (2016.01) | |
| *B60W 30/20* | (2006.01) | |
| *G06F 19/00* | (2011.01) | |
| *B60K 6/48* | (2007.10) | |

(52) U.S. Cl.
CPC ............ *B60W 20/00* (2013.01); *B60W 30/20* (2013.01); *B60K 2006/4825* (2013.01); *B60W 2540/10* (2013.01); *B60W 2600/00* (2013.01); *B60W 2710/023* (2013.01); *B60W 2710/0644* (2013.01); *B60W 2710/0666* (2013.01); *B60W 2710/083* (2013.01); *B60W 2710/085* (2013.01); *Y02T 10/6252* (2013.01); *Y02T 10/6286* (2013.01); *Y10S 903/93* (2013.01)

(58) Field of Classification Search
USPC ...................... 701/54, 22; 477/5; 180/65.361
See application file for complete search history.

(56) References Cited

U.S. PATENT DOCUMENTS

| | | |
|---|---|---|
| 6,336,889 B1 | 1/2002 | Oba et al. |
| 7,766,108 B2 | 8/2010 | Rimaux et al. |
| 2002/0029624 A1 | 3/2002 | Gassner et al. |
| 2004/0006414 A1 | 1/2004 | Suzuki |
| 2007/0246554 A1 | 10/2007 | Watanabe et al. |
| 2008/0129049 A1 | 6/2008 | Sauvlet et al. |
| 2009/0156355 A1 | 6/2009 | Oh et al. |
| 2010/0063662 A1 | 3/2010 | Harada et al. |
| 2010/0070123 A1 | 3/2010 | Itoh et al. |
| 2010/0206649 A1* | 8/2010 | Ishii .......................... B60K 6/26 180/65.31 |
| 2011/0287889 A1* | 11/2011 | Eisele et al. ....................... 477/5 |
| 2013/0096789 A1* | 4/2013 | McDonnell et al. ........... 701/54 |

FOREIGN PATENT DOCUMENTS

| | | |
|---|---|---|
| DE | 102009000706 A1 | 8/2010 |
| EP | 0916547 A2 | 5/1999 |
| EP | 0922600 A2 | 6/1999 |
| EP | 1925521 A2 | 5/2008 |
| EP | 1975028 A2 | 10/2008 |
| EP | 1 987 995 A2 | 11/2008 |
| EP | 2141056 A1 | 1/2010 |
| FR | 2882698 A1 | 9/2006 |
| JP | 2000-219062 A | 8/2000 |

OTHER PUBLICATIONS

International Search Report dated Jul. 5, 2012, International Application No. PCT/EP2011/074043; 5 pages.
International Search Report for PCT Application No. PCT/EP2012/051485 dated Jul. 2, 2012; 4 pages.
International Search Report for PCT Application No. PCT/EP2012/051486 dated Jul. 4, 2012; 3 pages.
International Search Report for PCT Application No. PCT/EP2012/051488 mailed Oct. 10, 2012; 6 pages.
Written Opinion for PCT Application No. PCT/EP2011/074043 mailed Jun. 23, 2013; 6 pages.
Dextreit, Clement; "Hybrid Electric Vehicle Controller and Mehtod of Controlling a Hybrid Electric Vehicle"; U.S. Appl. No. 13/983,230, filed Aug. 1, 2013; 42 pages.
Hancock, Matthew; "Hybrid Electric Vehicle Controller and Method of Controlling a Hybrid Electric Vehicle"; U.S Appl. No. 13/983,235, filed Aug. 1, 2013; 28 pages.
Hancock et al., Matthew; "Hybrid Electric Vehicle and Method of Controlling a Hybrid Electric Vehicle"; U.S. Appl. No. 13/983,238, filed Aug. 1, 2013; 19 pages.
Laing, Philippa; "Hybrid Electric Vehicle Controller and Method of Controlling a Hybrid Electric Vehicle"; U.S. Appl. No. 13/997,528, filed Jun. 24, 2013; 19 pages.
Notification of First Office Action, Chinese Patent Application No. 201280015884.7, Aug. 24, 2015, 11 pages.

* cited by examiner

HYBRID ELECTRIC VEHICLE CONTROLLER AND METHOD OF CONTROLLING A HYBRID ELECTRIC VEHICLE

CROSS REFERENCE TO RELATED APPLICATIONS

This application is a National Phase Application of Patent Application PCT/EP2012/051487 filed on 31 Jan. 2012, which claims priority to GB1101705.0, filed 1 Feb. 2011, of which both applications are incorporated by reference herein in their entirety.

FIELD OF THE INVENTION

The present invention relates to a controller and a method of controlling a hybrid electric vehicle (HEV). In particular but not exclusively the invention relates to a controller and a method of controlling a parallel-type HEV during a transition from an electric vehicle (EV) mode of operation to a parallel mode.

BACKGROUND

It is known to provide a hybrid electric vehicle (HEV) having an electric machine and an internal combustion engine (ICE) connected in parallel to a driveline of the vehicle.

The vehicle may be operated in an electric vehicle (EV) mode in which torque to the driveline is provided exclusively by the electric machine. Alternatively the vehicle may be operated in a parallel mode in which torque is provided to the driveline by the ICE and electric machine.

It is desirable to provide a HEV having improved drivability. It is also desirable to provide a HEV having improved noise, vibration and harshness (NVH) performance in respect of the transition from the EV mode to the parallel mode of operation.

That is, it is desirable to provide a HEV having improved smoothness in the transition from EV to parallel mode. Smoothness can be compromised by fluctuations in vehicle rate of acceleration and/or speed when the transition is made, such as jerk or the like. It is further desirable to provide a HEV operable to transition from the EV mode to the parallel mode in a reduced time period.

STATEMENT OF THE INVENTION

Embodiments of the invention may be understood by reference to the appended claims.

Aspects of the invention provide a controller, a motor vehicle and a method as claimed in the appended claims.

In another aspect of the invention for which protection is sought there is provided control means for a hybrid electric vehicle (HEV) operable to control first and second actuators of a vehicle to deliver motive torque to drive a vehicle, the control means being operable to control a vehicle to transition between a first mode in which a first actuator is substantially disconnected from a driveline of a vehicle and a second actuator delivers motive torque to drive a vehicle and a second mode in which a first actuator is connected to a driveline by means of a releasable torque transmitting means and the control means controls first and second actuators to deliver respective first and second actuator target torque split values to drive a vehicle thereby to provide a driver demanded drive torque, when a transition from the first mode to the second mode is required the control means being configured to control rotation of a first actuator by means of a speed control means towards a target first actuator speed and to control a releasable torque transmitting means to transition between an actuator disconnected condition and an actuator connected condition thereby to connect a first actuator to a driveline, the control means being further configured to ramp an amount of torque delivered by a first actuator towards a first actuator target torque split value, and to ramp an amount of torque delivered by a second actuator towards a second actuator target torque split value whilst retaining a total drive torque value provided to a vehicle substantially equal to a driver demanded torque, wherein the target first actuator speed is a speed greater than a speed at which a first actuator would rotate with a releasable torque transmitting means in the actuator connected condition.

Thus an amount of torque delivered from a first actuator as demanded by the speed control means may be blended with the target first actuator torque split value. The first actuator torque split value which may be determined by the control means according to an energy management program or protocol (EMP) to obtain optimum vehicle performance.

That is, the torque value demanded by the speed control means may be blended with the first actuator target torque split value such that the amount of torque provided by a first actuator changes from the value demanded by the speed control means to the first actuator target torque split value (or EMP value) over a period of time.

Furthermore, the target rotational speed of the first actuator is set to a value greater than a speed at which the first actuator would rotate if connected to a driveline, being the expected speed of the first actuator when the releasable torque transmitting means is in the actuator connected condition. This feature results in a significant increase in a speed with which a first actuator may reach a speed at which the releasable torque transmitting means may assume an actuator connected condition. Furthermore, it reduces a difference between an amount of torque generated by a first actuator and the first actuator target torque split value at the moment the releasable torque transmitting means assumes the actuator connected condition.

Embodiments of the invention have the advantage that a more smooth transition from the first mode to the second mode may be made, enhancing a noise, vibration and harshness (NVH) performance of a vehicle.

It is to be understood that a HEV controlled by control means according to the present invention is not restricted to having only first and second actuators. The HEV may have more than two actuators.

It is to be further understood that the first and second actuator torque values may be determined by the control means.

In an embodiment the control means is configured to ramp an amount of torque delivered by a first actuator to become equal to the first actuator target torque split value and to adjust an amount of torque delivered by a second actuator to become equal to the second actuator target torque split value once a releasable torque transmitting means has assumed an actuator connected condition.

It is to be understood that the first and second target torque split values may change responsive to driver torque demand. Furthermore, the target first actuator speed may also change responsive to driver torque demand.

In an embodiment the control means is configured to control an amount of motive torque delivered by a second actuator during the course of a transition of a releasable torque transmitting means between an actuator disconnected condition and an actuator connected condition such that a total drive torque delivered by first and second actuators remains substantially equal to a value of a driver demanded torque.

This feature has the advantage that as a first actuator is connected to a driveline and begins to make a contribution to the net amount of torque delivered to a driveline by first and second actuators, this contribution may be compensated for by the second actuator in maintaining the total torque delivered to the driveline substantially equal to the driver demanded torque. It is to be understood that for a given value of driver demanded torque, an amount of torque delivered by a second actuator will typically decrease as a first actuator is connected to a driveline and delivers drive torque thereto.

In an embodiment when a transition from the first mode to the second mode is required a speed control means is controlled to control a speed of rotation of a first actuator to approach a target speed.

In an embodiment the control means is further configured to control a first actuator to maintain a speed of rotation thereof substantially equal to a speed at which a first actuator would rotate when in the actuator connected condition whilst a releasable torque transmitting means transitions from an actuator disconnected condition to an actuator connected condition.

The control means may be configured to control a releasable torque transmitting means to assume an actuator connected condition when a speed of a first actuator is substantially equal to a speed at which a first actuator would rotate with a releasable torque transmitting means in an actuator connected condition.

Thus in some embodiments as a first actuator increases in speed towards the first actuator target speed, when a first actuator speed is equal to the speed at which a first actuator would rotate with a releasable torque transmitting means in the actuator connected condition a releasable torque transmitting means is controlled to assume the actuator connected condition. Since the target speed of a first actuator is greater than the speed at which a first actuator would rotate with a releasable torque transmitting means in the actuator connected condition, a releasable torque transmitting means may be controlled to assume the actuator connected condition as the speed of a first actuator passes through that speed as it increases towards the target speed.

It is to be understood that whilst the control means is configured to control a first actuator to achieve and maintain a target speed greater than the speed at which a first actuator would rotate with a releasable torque transmitting means in the actuator connected condition, the actual speed of rotation of a first actuator may not actually attain the target speed.

This may be due for example to a torque loading on the first actuator as the releasable torque transmitting means transitions from the actuator disconnected condition to the actuator connected condition. Thus the torque loading experienced by the first actuator may be sufficiently high to prevent the speed of rotation of the first actuator from achieving the target speed even though the control means is providing a control signal to increase the speed of rotation of the first actuator towards the target speed in an attempt to achieve this speed. The control signal to increase the speed of rotation of the first actuator may for example be a control signal indicating an amount of torque to be delivered by a first actuator.

The failure to achieve the required rotational speed of the first actuator may be due at least in part to the speed at which the releasable torque transmitting means transitions from the actuator disconnected condition to the actuator connected condition. In other words the first actuator may not have sufficient time to achieve the target speed due to the relatively high rate at which a torque loading is applied thereto as the releasable torque transmitting means transitions from the actuator disconnected condition to the actuator connected condition.

Embodiments of the invention have the advantage that when the releasable torque transmitting means has fully assumed the actuator connected condition, the amount of torque delivered to the driveline by the first actuator is more likely to be closer to the first actuator target torque split value.

In an embodiment, when a transition from a first mode to a second mode is required the control means is configured to control a speed of rotation of a first actuator by means of a speed control means until a releasable torque transmitting means is in an actuator connected condition.

In an embodiment when an amount of torque delivered by a first actuator is ramped from a value demanded by a speed control means to a first actuator target torque split value according to a ramp function, wherein the ramp function comprises one selected from a substantially linear function and a substantially non-linear function.

In an embodiment the ramp function is responsive to a value of a driver demanded torque.

In an embodiment the ramp function is arranged to increase the rate at which the amount of torque delivered by the first actuator is ramped from the value demanded by the speed control means to the first actuator target torque split value as the amount of driver demanded torque increases.

This has the advantage that the transition from the first mode to the second mode occurs more quickly when a driver is demanding greater torque, thereby increasing a drivability of the vehicle.

Optionally the ramp function is arranged to increase a rate at which an amount of torque delivered by a first actuator is ramped from the value demanded by the speed control means to the first actuator target torque split value responsive to a value of driver demanded torque.

In an embodiment the control means is configured to ramp an amount of torque delivered by a first actuator at a rate corresponding to a rate of change of a first actuator target torque split value, the rate of change of torque delivered by a first actuator being offset from that of the first actuator target torque split value thereby to cause convergence of an amount of torque delivered by a first actuator towards the first actuator target torque split value.

It is to be understood that if the amount of torque delivered by the first actuator is ramped at the same rate as the rate of change of the first actuator target torque split value the first actuator torque value may 'track' the first actuator target torque split value, i.e. it may rise and fall in a corresponding manner but a difference between the torque values will remain unchanged. Thus in some embodiments of the invention the amount of torque delivered by a first actuator is changed in a manner so as to track the first actuator target torque split value but with an offset thereby to cause convergence. Thus the amount of torque delivered by the first actuator is arranged to change at a rate different from the first actuator target torque split value in such a manner as to cause convergence of the amount of torque delivered by the first actuator towards the first actuator target torque split value.

Optionally the control means may be configured to determine the first and second target torque split values according to an energy management protocol based on one or more vehicle parameters.

In one aspect of the invention for which protection is sought there is provided a hybrid electric vehicle comprising control means according to a preceding aspect.

In an embodiment the first actuator comprises an internal combustion engine, the second actuator comprises an electric machine and the releasable torque transmitting means comprises clutch means.

In a further aspect of the invention for which protection is sought there is provided a method of controlling a hybrid electric vehicle to deliver motive torque to drive a vehicle by means of first and second actuators, the method comprising:
controlling the vehicle to transition between a first mode in which the first actuator is substantially disconnected from a driveline of a vehicle and a second actuator delivers motive torque to drive a vehicle, and
a second mode in which the first actuator is connected to the driveline by means of a releasable torque transmitting means and the control means controls the first and second actuators to deliver respective first and second actuator target torque split values to drive the vehicle thereby to provide a driver demanded drive torque,
when a transition from the first mode to the second mode is required the method comprising controlling rotation of the first actuator by means of a speed control means towards a target rotational speed and controlling the releasable torque transmitting means to transition between an actuator disconnected condition and an actuator connected condition thereby to connect the first actuator to the driveline,
the method further comprising ramping an amount of torque delivered by the first actuator from a value demanded by the speed control means to the first actuator target torque split value, and ramping an amount of torque delivered by the second actuator from a current value to the second actuator target torque split value whilst retaining a total drive torque value provided to drive a vehicle substantially equal to the driver demanded torque,
whereby the target first actuator speed is a speed greater than a speed at which the first actuator would rotate with a releasable torque transmitting means in the actuator connected condition.

In an aspect of the invention there is provided a hybrid electric vehicle (HEV) comprising: first and second actuators; a driveline, the first and second actuators being operable to deliver torque to the driveline; and releasable torque transmitting means operable releasably to couple the first actuator to the driveline, the releasable torque transmitting means being operable between a first condition in which the first actuator is substantially disconnected from the driveline and a second condition in which the first actuator is substantially connected to the driveline, the vehicle having control means operable to control the vehicle to transition between a first mode in which the releasable torque transmitting means is in the first condition and a second mode in which the releasable torque transmitting means is in the second condition, in the first mode the control means being arranged to control the second actuator to deliver a torque to the driveline corresponding to a value of driver demanded torque, in the second mode the control means being arranged to control the first and second actuators to deliver respective first and second actuator torques determined according to an energy management program (EMP) thereby to provide the driver demanded torque to the driveline, when a transition from the first mode to the second mode is required the control means being configured to control rotation of the first actuator by means of a speed control means and to control the releasable torque transmitting means to assume the second condition, the control means being further configured to ramp the amount of torque delivered by the first actuator from a value demanded by the speed control means to the first actuator EMP torque value and to ramp the amount of torque delivered by the second actuator to become equal to the second actuator EMP torque value whilst retaining a sum of the torque values provided by the first and second actuators substantially equal to the driver demanded torque.

In an embodiment the control means is configured to ramp the amount of torque delivered by the first actuator to become equal to the first actuator EMP torque value and to adjust the amount of torque delivered by the second actuator to become equal to the second actuator EMP torque once the releasable torque transmitting means has assumed the second condition.

The vehicle may be configured to control the amount of torque delivered to the driveline by the second actuator during the course of a transition of the releasable torque transmitting means between the first and second conditions such that the total torque delivered to the driveline by the first and second actuators remains substantially equal to the driver demanded torque.

In the first mode the speed control means may be configured to control the speed of rotation of the first actuator to achieve a target speed.

The control means may be further configured to control the first actuator to maintain the speed of rotation of the first actuator substantially equal to the target speed whilst the releasable torque transmitting means transitions from the first condition to the second condition.

The target speed may be a speed substantially equal to the speed at which the first actuator would rotate with the releasable torque transmitting means in the second condition.

The vehicle may be configured to control the releasable torque transmitting means to assume the second condition when the speed of the first actuator is substantially equal to the target speed.

Alternatively the target speed may be a speed greater than the speed at which the first actuator would rotate with the releasable torque transmitting means in the second condition.

The vehicle may be configured to control the releasable torque transmitting means to assume the second condition when the speed of the first actuator is substantially equal to the speed at which the first actuator would rotate with the releasable torque transmitting means in the second condition.

In an embodiment when a transition from the first mode to the second mode is required the vehicle is configured to control the speed of rotation of the first actuator by means of the speed control means until the releasable torque transmitting means is in the second condition.

In an embodiment the amount of torque delivered by the first actuator ma be ramped from a value demanded by the speed control means to the first actuator EMP torque value according to a ramp function.

The ramp function may comprise a substantially linear function.

In addition or instead the ramp function may comprise a substantially non-linear function.

The ramp function may be responsive to the value of driver demanded torque.

In an embodiment the ramp function is arranged to increase the rate at which the amount of torque delivered by the first actuator is ramped from the value demanded by the speed control means to the first actuator EMP torque value as the amount of driver demanded torque increases.

The vehicle may be configured to ramp the amount of torque delivered by the first actuator at a rate corresponding to a rate of change of the first actuator EMP torque value but having an offset thereby to cause convergence of the amount of torque delivered by the first actuator towards the first actuator EMP torque.

Optionally when in the second mode the vehicle is configured to control the relative amounts of torque provided by the first and second actuators according to the EMP based on one or more vehicle parameters.

Further optionally when in the first mode the vehicle is configured to control the amount of torque provided by the second actuator according to the energy management program based on one or more vehicle parameters.

In an embodiment the one or more vehicle parameters comprise at least one selected from amongst a crankshaft speed, a driver demanded crankshaft torque, a battery state of charge, an engine temperature, an engine coolant temperature, an exhaust gas temperature, a state of a gearbox of the vehicle being a gear ratio of the gearbox, a wheel speed and a driver demanded wheel torque.

The releasable torque transmitting means may be provided between the first actuator and the second actuator.

When in the first condition the control means may be configured to control a speed of rotation of the first actuator to correspond to the speed of rotation of the second actuator prior to controlling the releasable torque transmitting means to assume the second condition.

The releasable torque transmitting means may comprise clutch means.

In an embodiment the first actuator comprises an internal combustion engine.

In an embodiment the second actuator comprises an electric machine.

The control means may be operable to control the second actuator as a motor or as a generator.

The first actuator may comprise a crankshaft and the second actuator may comprise a starter generator integrated into the crankshaft of the first actuator.

In a further aspect of the invention for which protection is sought there is provided a method of controlling a hybrid electric vehicle to transition between a first mode in which a first actuator does not deliver torque to a driveline and a second actuator does deliver torque to the driveline and a second mode in which the first and second actuators both deliver torque to the driveline according to a required energy management program (EMP) torque split in which the first actuator delivers a first actuator EMP torque and the second actuator delivers a second actuator EMP torque, the method comprising: when a transition from the first mode to the second mode is required: controlling rotation of the first actuator by means of a speed control means; coupling the first actuator to the driveline by means of releasable torque transmitting means, the step of coupling the first actuator to the driveline comprising controlling the releasable torque transmitting means to transition from a first mode in which the first actuator is isolated from the driveline to a second mode in which the first actuator is coupled to the driveline; ramping the amount of torque delivered to the driveline by the first actuator from a value demanded by the speed control means to the first actuator EMP torque value; and ramping the amount of torque delivered to the driveline by the second actuator to become equal to the second actuator EMP torque value whilst retaining a sum of the torque values provided by the first and second actuators substantially equal to the driver demanded torque.

In an embodiment the method comprises the step of ramping the amount of torque delivered by the first actuator to become equal to the first EMP torque and ramping the amount of torque delivered by the second actuator to become equal to the second EMP torque once the releasable torque transmitting means has assumed the second condition.

Optionally the method comprises the step of controlling the amount of torque delivered to the driveline by the second actuator during the course of a transition of the releasable torque transmitting means between the first and second conditions such that the total torque delivered to the driveline by the first and second actuators remains substantially equal to the driver demanded torque.

As discussed above this feature has the advantage that if the first actuator makes a contribution to the net amount of torque delivered to the driveline by the first and second actuators, this contribution may be compensated for by the second actuator in maintaining the total torque delivered to the driveline substantially equal to the driver demanded torque.

The method may comprise the step of in the first mode controlling the speed of rotation of the first actuator to achieve a target speed.

The method may comprise controlling the first actuator to maintain the speed of rotation of the first actuator substantially equal to the target speed whilst the releasable torque transmitting means transitions from the first condition to the second condition.

The target speed may be a speed substantially equal to the speed at which the first actuator would rotate with the releasable torque transmitting means in the second condition.

The method may comprise controlling the releasable torque transmitting means to assume the second condition when the speed of the first actuator is substantially equal to the target speed.

Alternatively the target speed may be a speed greater than the speed at which the first actuator would rotate with the releasable torque transmitting means in the second condition.

The method may comprise the step of controlling the releasable torque transmitting means to assume the second condition when the speed of the first actuator is substantially equal to the speed at which the first actuator would rotate with the releasable torque transmitting means in the second condition.

Thus in some embodiments when the first actuator speed is equal to the speed at which the first actuator would rotate with the releasable torque transmitting means in the second condition the releasable torque transmitting means is controlled to assume the second condition. In the case that the target speed of the first actuator is greater than the speed at which the first actuator would rotate with the releasable torque transmitting means in the second condition, the releasable torque transmitting means may be controlled to assume the second condition as the speed of the first actuator passes through that speed as it increases towards the target speed.

It is to be understood that whilst the control means may be configured to control the first actuator to achieve and maintain a target speed greater than the speed at which the first actuator would rotate with the releasable torque transmitting means in the second condition, the actual speed of rotation of the first actuator may not actually attain the target speed.

This may be due for example to a torque loading on the first actuator as the releasable torque transmitting means transitions from the first mode to the second mode. Thus the torque loading experienced by the first actuator may be sufficiently high to prevent the speed of rotation of the first actuator from achieving the target speed even though the control means is providing a control signal to increase the speed of rotation of the first actuator towards the target speed. The control signal to increase the speed of rotation of the first actuator may for example be control signal indicating an amount of torque to be delivered by the first actuator.

The failure to achieve the required rotational speed of the first actuator may be due at least in part to the speed at which the releasable torque transmitting means transitions from the first mode to the second mode. In other words the first actuator may not have sufficient time to achieve the target speed due to the relatively high rate at which a torque loading is applied thereto as the releasable torque transmitting means transitions from the first mode to the second mode.

This has the advantage that when the releasable torque transmitting means has fully assumed the second mode, the amount of torque delivered to the driveline by the first actuator is more likely to be closer to the first actuator EMP torque value.

In an embodiment when a transition from the first mode to the second mode is required the method comprises controlling the speed of rotation of the first actuator by means of the speed control means until the releasable torque transmitting means is in the second condition.

The method may comprise the step of ramping the amount of torque delivered by the first actuator to become equal to the first EMP torque according to a ramp function.

The ramp function may comprise a substantially linear function.

Alternatively or in addition the ramp function may comprise a substantially non-linear function.

In an embodiment the ramp function is responsive to the value of driver demanded torque.

The method may comprise the step of increasing the rate at which the amount of torque delivered by the first actuator is ramped from the value demanded by the speed control means to the first actuator EMP torque value as the amount of driver demanded torque increases.

The method may comprise the step of ramping the amount of torque delivered by the first actuator at a rate corresponding to a rate of change of the first actuator EMP torque value, the method further comprising providing an offset to the rate thereby to cause convergence of the amount of torque delivered by the first actuator towards the first actuator EMP torque.

Optionally when the vehicle is in the second mode the method comprises controlling the relative amounts of torque provided by the first and second actuators according to the EMP based on one or more vehicle parameters.

Further optionally when in the first mode the method comprises controlling the amount of torque provided by the second actuator according to the energy management program based on one or more vehicle parameters.

In an embodiment the one or more vehicle parameters comprise at least one selected from amongst a crankshaft speed, a driver demanded crankshaft torque, a battery state of charge, an engine temperature, an engine coolant temperature, an exhaust gas temperature, a state of a gearbox of the vehicle being a gear ratio of the gearbox, a wheel speed and a driver demanded wheel torque.

The method may comprise providing the releasable torque transmitting means between the first actuator and the second actuator.

In an embodiment when in the first condition the method comprises controlling a speed of rotation of the first actuator to correspond to the speed of rotation of the second actuator prior to controlling the releasable torque transmitting means to assume the second condition.

The releasable torque transmitting means may comprise clutch means.

In an embodiment the first actuator comprises an internal combustion engine.

In an embodiment the second actuator comprises an electric machine.

The method may comprise the step of controlling the second actuator as a motor at one moment in time and controlling the second actuator as a generator at another moment in time.

The first actuator may comprise a crankshaft and the second actuator may comprise a starter generator integrated into the crankshaft of the first actuator.

Within the scope of this application it is envisaged that the various aspects, embodiments, examples and alternatives, and in particular the features thereof, set out in the preceding paragraphs, in the claims and/or in the following description and drawings, may be taken independently or in any combination. For example, features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which.

DETAILED DESCRIPTION

Figure 1:
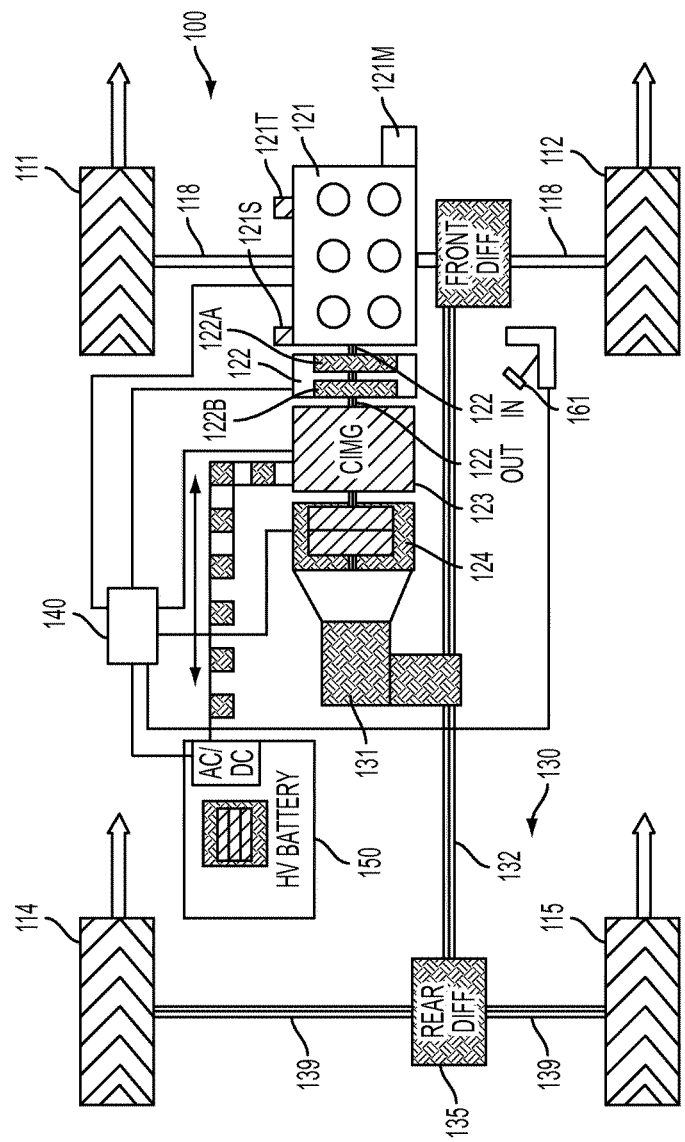
FIG. 1 is a schematic illustration of a hybrid electric vehicle (HEV) according to an embodiment of the invention.

FIG. 1 shows a hybrid electric vehicle (HEV) 100 according to an embodiment of the present invention. The HEV 100 has an internal combustion engine 121 releasably coupled to a crankshaft integrated motor/generator (CIMG) 123 by means of a clutch 122. The clutch 122 has an input shaft 122IN coupled to a crankshaft of the engine 121 and arranged to rotate therewith. The clutch 122 also has an output shaft 122OUT coupled to the CIMG 123 and arranged to rotate therewith.

The clutch 122 has a pair of plates 122A, 122B that are fixedly coupled to the input shaft 122IN and output shaft 122OUT respectively.

The clutch 122 is operable to transition between an open condition and a closed condition. In the open condition the plates 122A, 122B are separated from one another such that substantially no torque is transferred from the input shaft 122IN to the output shaft 122OUT. In the closed condition the plates 122A, 122B are urged together such that torque applied to the input shaft 122IN by the engine 121 is transferred substantially directly to the output shaft 122OUT.

The clutch 122 is operable to move the plates 122A, 122B towards one another as the clutch 122 transitions from the open condition to the closed condition whereby the amount of torque transferred from the input shaft 122IN to the output shaft 122OUT may be increased in a controlled manner.

Similarly, the clutch 122 is operable to move the plates 122A, 122B away from one another as the clutch transitions from the closed condition to the open condition.

The CIMG 123 is in turn coupled to an automatic transmission 124. The transmission 124 is arranged to drive a pair of front wheels 111, 112 of the vehicle 100 by means of a pair of front drive shafts 118. The transmission 124 is also arranged to drive a pair of rear wheels 114, 115 by means of an auxiliary driveline 130 having an auxiliary driveshaft 132, a rear differential 135 and a pair of rear driveshafts 139.

A battery 150 is provided that may be coupled to the CIMG 123 in order to power the CIMG 123 when it is operated as a motor. Alternatively the battery 150 may be coupled to the CIMG 123 to receive charge when the CIMG 123 is operated as a generator, thereby to recharge the battery 150.

The vehicle 100 is configured to operate in either one of a parallel mode and an electric vehicle (EV) mode.

In the parallel mode of operation the clutch 122 is closed and the engine 121 is arranged to provide torque to the transmission 124. In this mode the CIMG 123 may be operated either as a motor or as a generator.

In the EV mode of operation the clutch 122 is opened and the engine 121 is turned off. Again, the CIMG 123 is then operated either as a motor or as a generator. It is to be understood that the CIMG 123 may be arranged to act as a generator in EV mode in order to effect regenerative braking of the vehicle.

The vehicle 100 has a controller 140 arranged to control the vehicle 100 to transition between the parallel and EV modes when required.

In the present embodiment when a transition from EV mode to parallel mode is required the controller 140 is configured to start the engine 121 by means of a starter motor 121M and to control the speed of the engine 121 to match that of the output shaft 122OUT of the clutch 122 before closing the clutch 122. In the embodiment of FIG. 1 the speed of the output shaft 122OUT corresponds to that of the CIMG 123, $W_c$. The controller 140 controls $W_e$ by reference to an output of an engine speed sensor 121S that provides a signal corresponding to the actual engine speed $W_e(t)$ at a given time t.

In the embodiment of FIG. 1 the controller 140 controls the engine 121 to achieve the required $W_e$ (which may be referred to as a target engine speed $W_{eT}$) by modulating the amount of torque $TQ_e$ that the controller 140 demands the engine 121 to provide.

The controller 140 is arranged to employ a closed loop feedback control methodology in order to modulate $TQ_e$ to achieve the required value of $W_e$. Thus, the controller 140 uses the signal from the speed measurement device 121S to calculate an engine speed error value e(t) which corresponds to a difference between the actual engine speed $W_e(t)$ and the target engine speed $W_{eT}$.

It is to be understood that it is desirable that the controller 140 controls the engine 140 to achieve $W_{eT}$ as quickly as possible and in a manner such that minimal overshoot of $W_{eT}$ occurs. Furthermore it is desirable to reduce oscillation of the engine about $W_{eT}$ to a minimum.

As well as controlling the engine to start and to achieve a target speed $W_{eT}$, in some embodiments the controller 140 is configured gradually to close the clutch 122 to connect the engine 121 to the CIMG 123 once the engine speed $W_e$ has achieved the target engine speed $W_{eT}$.

It is to be understood that the controller 140 is configured to maintain the engine speed at the target engine speed $W_{eT}$ as the clutch 122 is gradually closed.

In some embodiments control of the engine speed $W_e$ is performed by means of an engine speed controller. The engine speed controller may be implemented by means of a software program run by the controller 140. Alternatively the engine speed controller may be provided by a separate controller, for example by a separate engine speed control module.

Once the clutch is closed the controller 140 is arranged to control the engine 121 and CIMG 123 to deliver torque to the driveline according to a torque split determined by an energy management program (EMP). In other words, the EMP is configured to determine the relative amounts of torque to be delivered to the transmission 124 by the engine 121 and CIMG 123 respectively.

Since torque to drive the vehicle 100 is provided substantially entirely by the CIMG 123 in EV mode it is to be understood that once the clutch 122 is closed the controller 140 will typically control the engine 121 and CIMG 123 such that the amount of torque provided to the transmission 124 by the engine 121 ($TQ_e$) is increased and the amount of torque provided by the CIMG 123 ($TQ_c$) is decreased (compared to that provided by the CIMG 123 when in EV mode) for a given value of driver demanded torque $TQ_d$.

However it is to be understood that the actual amounts of torque provided to the transmission 124 by the engine 121 and CIMG 123 will depend on the value of driver demanded torque $TQ_d$.

For example if $TQ_d$ is substantially zero, $TQ_e$ and $TQ_c$ may also be substantially zero. In some embodiments when $TQ_d$ is substantially zero the controller 140 may be configured to control the engine 121 to deliver a positive torque $TQ_e$ and the CIMG 123 to deliver a negative torque $TQ_c$, the two torque values being substantially equal in magnitude so that the net torque to the transmission 124 is substantially zero. It is to be understood that the CIMG 123 may also be arranged to deliver a negative torque at other times when $TQ_d$ is non-zero.

It is to be understood that when the CIMG 123 delivers a negative torque electric power may be generated by the CIMG 123 for storage in the battery 150.

In the present embodiment the controller 140 is configured to control the engine 121 and CIMG 123 to change the amount of torque provided to the transmission 124 by each in a substantially linear manner from their value substantially at the instant of clutch closure to the values determined by the EMP.

Figure 2:
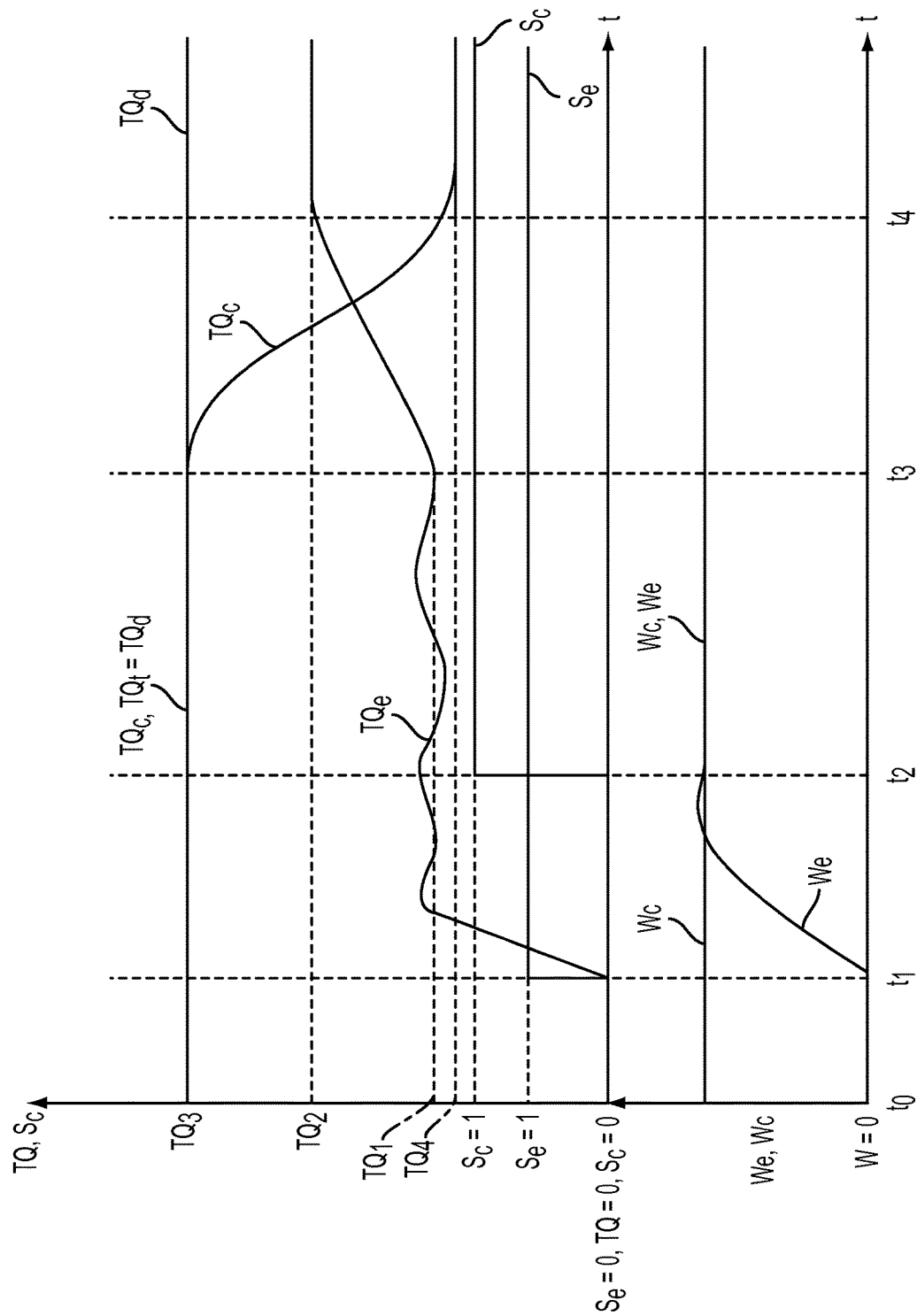
FIG. 2 shows an example of a plot of demanded torque from an internal combustion engine $TQ_e$ and a crankshaft integrated motor generator (CIMG) $TQ_c$ as a function of time during a transition from an electric vehicle (EV) mode to a parallel mode together with engine speed $W_e$, CIMG speed $W_c$, clutch state $S_c$ and engine on/off state $S_e$ for one embodiment of the invention.

FIG. 2 shows a plot of $W_e$ and $W_c$ as a function of time together with the amounts of torque generated by each of the engine 121 ($TQ_e$) and CIMG 123 ($TQ_c$) and the total torque $TQ_t$ provided to the transmission 124 by the engine 121 and the CIMG 123 together. It is to be understood that $TQ_t$ is typically arranged to correspond to the driver demanded torque $TQ_d$.

FIG. 2 also shows the state of a clutch control signal $S_c$ being a signal by means of which the controller 140 controls the clutch 122 to open or close and the state of an engine start/stop control signal $S_e$ by means of which the controller 140 controls the engine 121 to start or stop.

When the controller 140 determines that the clutch 122 should be open the controller 140 sets control signal $S_c=0$. If the clutch 122 is closed a clutch controller (which may be provided by a transmission control module or TCM) controls the clutch 122 to open. When the controller 140 determines that the clutch 122 should be closed the controller sets control signal $S_c=1$. If the clutch 122 is open the clutch controller controls the clutch 122 to close.

Similarly, when the controller 140 determines that the engine 121 should be off it sets control signal $S_e=0$ whilst when the controller 140 determines that the engine 121 should be on it sets control signal $S_e=1$. An engine controller (not shown) then controls operation of the engine 121 and starter motor 121M accordingly.

FIG. 2 illustrates control of the vehicle 100 during an example transition from EV to parallel mode.

It can be seen that at time $t_0$ in the example of FIG. 2 the clutch 122 is set to the open condition ($S_c=0$) and the engine 121 is set to remain off ($S_e=0$). The amount of torque developed by the engine 121 ($TQ_e$) is therefore substantially zero.

In contrast, the CIMG 123 is providing a torque $TQ_c$ to the transmission 124, $TQ_c$ being equal to $TQ_d$.

At time $t_1$ the controller 140 controls the engine 121 to start by setting engine start/stop control signal $S_e=1$.

The controller 140 then controls the engine 121 to spin up to a speed corresponding to that of the CIMG 124 ($W_c$) so that the clutch 122 may be closed without causing an undue decrease in NVH performance of the vehicle 100.

Thus, at time $t_2$ when $W_e$ is substantially equal to $W_c$ the controller 140 controls the clutch 122 to close by setting control signal $S_c=1$ as described above. Whilst the clutch 122 is closing the controller 140 controls the engine 121 to maintain a speed corresponding to that of the CIMG 123, i.e. $W_e=W_c$.

Once the clutch 122 is fully closed (at time $t_3$) the controller 140 controls the engine 121 and CIMG 123 to deliver respective amounts of torque according to the torque split determined by the EMP.

If at $t_3$ the amounts of torque being delivered by the engine 121 and CIMG 123 are not equal to the required torque split determined by the EMP then the controller 140 controls the engine 121 and CIMG 123 gradually to change the amount of torque they are each providing to the transmission 124 according to a substantially linear ramp function although other functions are also useful.

The controller 140 is arranged to perform this operation whilst maintaining a total torque $TQ_t$ delivered to the transmission 124 substantially equal to a value of driver demanded torque $TQ_d$ as determined by the controller 140.

As can be seen from FIG. 2, between time $t_3$ and $t_4$ $TQ_e$ is controlled to change from a value $TQ_1$ at time $t_3$ to a value $TQ_2$ at time $t_4$.

Similarly, $TQ_c$ is configured to change from a value $TQ_3$ at time $t_3$ to a value $TQ_4$ at time $t_4$.

Throughout the period from $t_3$ to $t_4$ the controller 140 controls the engine 121 and the CIMG 123 such that the total torque $TQ_t$ provided to the transmission 124 corresponds to the value of driver demanded torque $TQ_d$ that the controller 140 determines is required to be provided to the transmission 124.

From time $t_4$ onwards the relative amounts of torque provided by the engine 121 and CIMG 123 are determined substantially entirely by the EMP and the controller 140 controls the engine 121 and CIMG 123 to provide torque accordingly.

Figure 3:
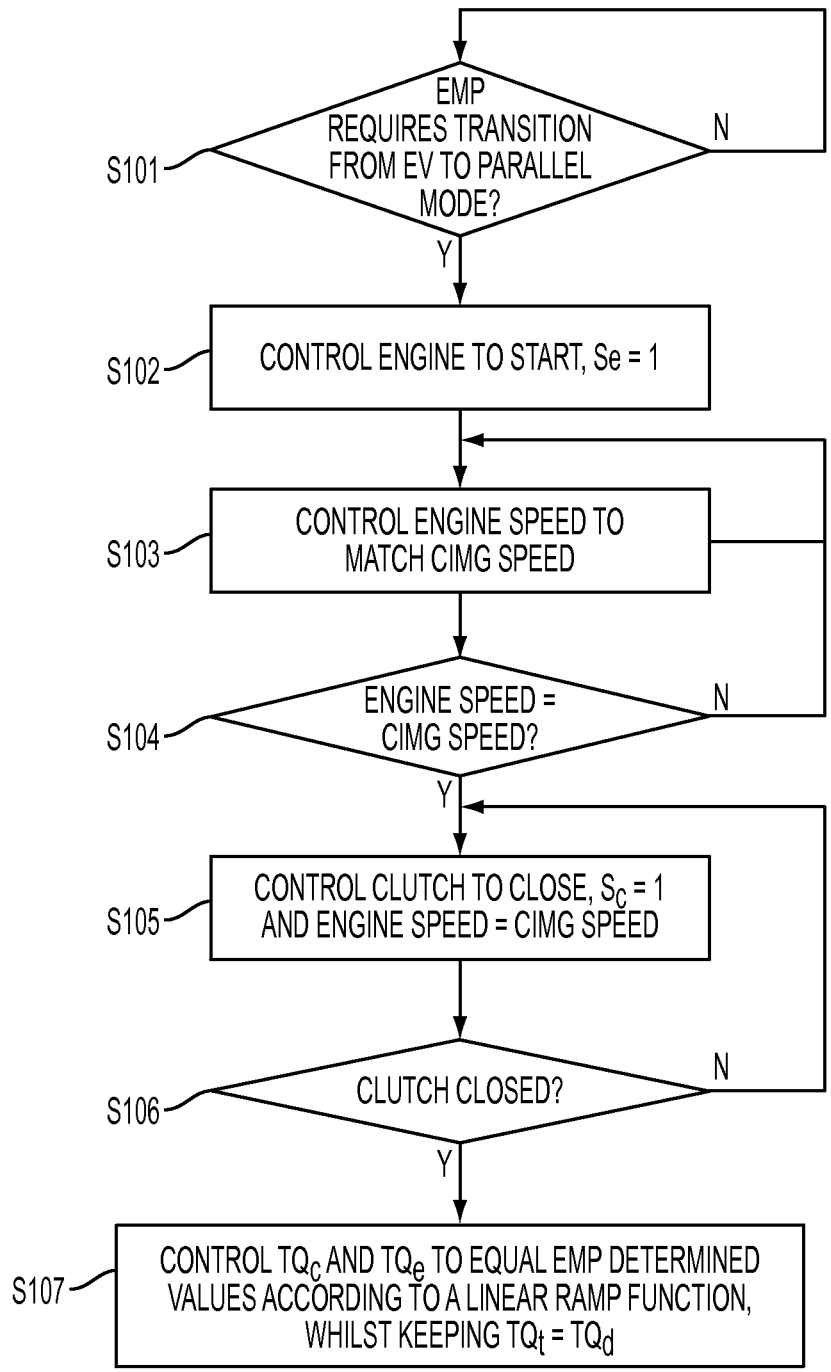
FIG. 3 is a flow chart of a method of transitioning from EV to parallel mode according to an embodiment of the invention.

FIG. 3 is a flow chart of the method of controlling the vehicle 100 when a transition from EV to parallel mode is required as discussed above.

At step S101 the controller 140 determines whether the EMP requires a transition from EV to parallel mode to be made.

If at step S101 the controller determines that a transition from EV to parallel mode is required then at step S102 the controller 140 controls the engine 121 to start by providing an engine start control signal $S_e=1$ to the engine 121.

At step S103 the controller 140 controls the engine 121 to rotate at a speed matching that of the CIMG 123.

At step S104 the controller determines whether the engine speed is equal to the CIMG speed. If the speeds are not equal the controller repeats step S103.

If the speeds are equal then at step S105 the controller 140 controls the clutch 122 to close by setting clutch control signal $S_c=1$. The controller 140 maintains the speeds of the engine 121 and CIMG 123 substantially equal throughout the period of clutch closure from time $t_2$ to time $t_3$.

At step S106 the controller 140 determines whether the clutch 122 has actually closed. If the clutch is not closed the controller 140 waits for the clutch 122 to close. If the clutch 122 has closed the controller 140 proceeds to step S107.

At step S107 the controller 140 controls $TQ_e$ and $TQ_c$ gradually to become equal to the values that the EMP determines they should provide.

As discussed above the controller controls $TQ_c$ and $TQ_e$ gradually to change according to a linear ramp function whilst keeping the total torque $TQ_t$ delivered to the transmission 124 substantially equal to the driver demanded torque $TQ_d$ determined by the controller 140.

As noted above other ramp functions are also useful.

It is to be understood that embodiments of the invention have the advantage that a transition from EV mode to parallel mode may be made with improved NVH performance. This is because when the transition from EV to parallel mode is made and clutch closure has taken place, the amounts of torque delivered to the driveline of the vehicle 100 by the engine 121 and CIMG 123 are controlled to approach the values determined to be required according to the EMP in a gradual manner rather than an abrupt, 'digital' manner in which torque values are changed substantially instantaneously.

If abrupt changes in the amounts of torque provided by the engine 121 and CIMG 123 are made, the risk exists that an undesirable acceleration and/or deceleration of the vehicle may take place. This is at least in part because the time taken for $TQ_c$ and $TQ_e$ to attain their respective EMP torque values may be different. Thus the CIMG 123 may attain its EMP value sooner than (or later than) the engine 121 resulting in $TQ_t$ rising above or falling below $TQ_d$.

In a variation on this embodiment of the invention, when a transition from EV to parallel mode is required the controller 140 is configured to control the engine 121 to achieve a target speed $W_T$ that is greater than $W_c$ rather than substantially equal to $W_c$. The controller 140 may provide a signal to the clutch 122 to close as the speed of the engine 121 increases through $W_c$. The controller 140 continues to control the engine 121 to achieve a speed equal to $W_T$ as the clutch closes.

It is to be understood that closure of the clutch 122 has the effect of increasing the load experienced by the engine 121 and therefore decreasing $W_e$ for a given engine torque.

Since in this alternative embodiment the controller 140 is seeking to control the engine 121 to achieve a speed that is greater than that of the CIMG 123 the amount of torque developed by the engine 121 will increase above that which would be developed if $W_{eT}$ were substantially equal to $W_c$.

This has the feature that upon completion of closure of the clutch 122 a difference between the respective amounts of torque required to be provided to the driveline by the engine 121 and CIMG 123 according to the EMP and the respective amounts of torque actually provided at the moment the clutch 122 is fully closed may be reduced.

Accordingly, as the clutch 122 is closed $TQ_c$ is controlled to decrease as $TQ_e$ increases in order to main $TQ_t$ substantially equal to $TQ_d$ throughout the period of clutch closure.

It is to be understood that in embodiments such as that described above in which $W_e$ is maintained substantially equal to $W_c$ during closure of the clutch 122 the amount of torque transferred to the transmission 124 by the engine 121 is in principle substantially zero throughout the period of clutch closure. Therefore it may not be necessary in such embodiments to adjust $TQ_c$ in order to compensate for torque provided to the transmission 124 by the engine 121.

However in some such embodiments some torque may still be provided by the engine 121 to the transmission 124 and therefore it may be necessary to adjust $TQ_c$ in order to compensate for this.

Once the clutch 122 is fully closed control of the engine 121 by the controller 140 transitions to control according to the EMP (rather than according to engine speed) in order to deliver a required proportion of $TQ_d$ as opposed to a required speed of rotation for clutch closure.

The transition from 'speed control' to 'EMP control' is performed in a similar manner to that described above whereby the relative amounts of torque provided by the engine 121 and CIMG 123 are 'blended', allowing a relatively smooth change in $TQ_e$ and $TQ_c$ and allowing $TQ_t$ to remain substantially equal to $TQ_d$ during the course of the torque blending process.

Thus, $TQ_e$ is controlled to transition to the value demanded by the EMP according to a substantially linear ramp function whilst $TQ_c$ is controlled to transition to the EMP demanded value in a complementary manner such that $TQ_t$ remains substantially equal to $TQ_d$.

Figure 4:
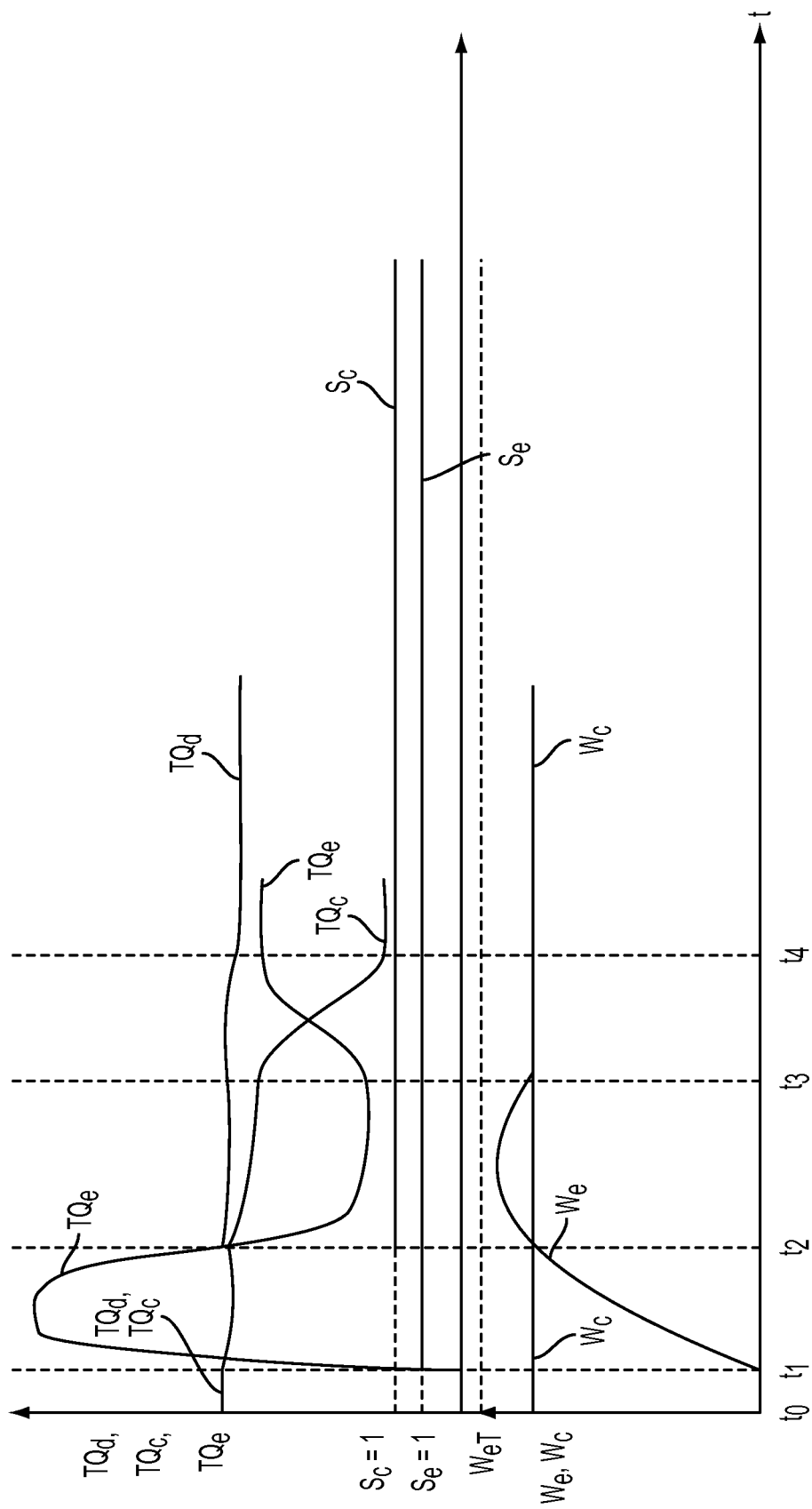
FIG. 4 shows an example of a plot of $TQ_e$ and $TQ_c$ as a function of time during a transition from EV mode to parallel mode together with $W_e$, $W_c$, $S_c$ and $S_e$ in a vehicle according to a further embodiment of the invention.

FIG. 4 shows a plot of $W_e$, $W_c$ as a function of time (lower plot) and a corresponding plot (upper plot) of $TQ_d$, $TQ_c$ and $TQ_e$ as a function of time for an embodiment in which $W_{eT}$ is greater than $W_c$. Also shown (middle plot) are the states of control signals $S_e$ and $S_c$.

It can be seen that at time $t_0$ the engine 121 is started ($S_e$=1) and $W_e$ is controlled to increase towards a target engine speed $W_{eT}$ as shown in the lower plot. As $W_e$ passes through $W_c$ (i.e. when $W_e$ is equal to or greater than $W_c$) at time $t_2$, the controller 140 controls the clutch 122 to close ($S_c$=1). As the clutch 122 closes the load applied to the engine 121 increases and $W_e$ is caused to decrease towards $W_c$. As the clutch continues to close the load on the engine 121 increases still further until at the moment of clutch closure $W_e$ and $W_c$ are substantially equal.

It is to be understood that $S_c$ may be set to a value of 1 before or after the value of $W_e$ passes through that of $W_c$.

As shown in the upper plot, $TQ_e$ increases relatively abruptly when the engine 121 is started before decreasing rapidly as $W_e$ approaches $W_{eT}$.

As the clutch 122 begins to close, a finite portion of $TQ_e$ is transmitted through the clutch 122 to the transmission 124. The controller 140 therefore controls $TQ_c$ to decrease in order to compensate for the torque transmitted to the transmission 124 from the engine 121 by the clutch 122 so that the total amount of torque $TQ_t$ delivered to the transmission 124 remains substantially equal to $TQ_d$ throughout the period of closure of the clutch 122.

As noted with respect to the embodiment described above, when the clutch 122 is fully closed at time $t_3$, a mismatch may exist between the actual values of $TQ_e$ and $TQ_c$ and the values demanded by the EMP.

Thus the controller 140 controls $TQ_e$ and $TQ_c$ to change in a substantially linear manner from their values at time $t_3$ towards the values demanded by the EMP. This transition takes place between time $t_3$ and time $t_4$ in the plot of FIG. 4.

It is to be understood that because $W_{eT}$ is set to be higher than $W_c$ in this embodiment, the value of $TQ_e$ at the moment of clutch closure (time $t_3$) is greater than in the case where $W_{eT}$ is substantially equal to $W_c$. This is because the controller 140 attempts to make $W_e$ equal to $W_{eT}$ by increasing $TQ_e$, but the torque loading applied by the clutch 122 as it is closed prevents $W_e$ from achieving $W_{eT}$.

Thus at the moment of clutch closure (when $W_e$ is substantially equal to $W_c$<$W_{eT}$), $TQ_e$ is higher than that value which would be required to maintain $W_e$ equal to $W_c$. Thus the amount by which $TQ_e$ must be increased and $TQ_c$ must be decreased in order to attain the respective torque values required according to the EMP is lower than if $W_{eT}$ were equal to Wc.

In some embodiments the target engine speed $W_{eT}$ during the transition from EV mode to parallel mode is responsive to the current value of $W_c$. Thus $W_{eT}$ may be greater than $W_c$ by a fixed amount, for example a value from around 300-400 rpm greater than $W_c$. Thus the value of $W_{eT}$ may track that of $W_c$ with a fixed offset.

Alternatively $W_{eT}$ may be greater than $W_c$ by a fixed proportion of $W_c$ such as 10%, 20%, 30% or any other suitable proportion. In some embodiments $W_{eT}$ is not responsive to $W_c$, $W_{eT}$ being a substantially fixed value regardless of the value of $W_c$.

It is to be understood that other arrangements are also useful.

It is to be understood that in the embodiments described, $W_c$ is the speed at which the engine 121 will rotate when the clutch 122 is closed. This is the reason $W_{eT}$ is set equal to $W_c$ or the value of $W_c$ plus a prescribed value of (say) 400 rpm in the second embodiment described above.

As noted above embodiments of the invention have the advantage that a transition from EV mode to parallel mode may be made with increased NVH performance. That is, an amount of noise, vibration and/or harshness of ride experienced by the driver of the vehicle 100 may be reduced. Alternatively or in addition, closure of the clutch 122 may be effected more rapidly for a given required NVH performance of the vehicle 100.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system for controlling an internal combustion engine and an electric machine of a hybrid electric vehicle (HEV) to deliver motive torque to drive the HEV,
the system being operable to control the HEV to transition between:
a first mode, in which the internal combustion engine is disconnected from a driveline of the HEV, and the electric machine delivers motive torque to drive the HEV; and
a second mode, in which the internal combustion engine is connected to the driveline by a releasable torque transmitter, and the system controls the internal combustion engine and the electric machine to deliver respective internal combustion engine target torque split value and electric machine target torque split value to drive the HEV thereby to provide a driver demanded drive torque;
wherein, when a transition from the first mode to the second mode is required, the system is configured:
to control rotation of the internal combustion engine by a speed control towards a target internal combustion engine speed; and
to control the releasable torque transmitter to transition between an engine disconnected condition and an engine connected condition thereby to connect the internal combustion engine to the driveline;
the system being further configured, after the releasable torque transmitter has transitioned to the engine connected condition and the internal combustion engine is connected to the driveline, to:
ramp an amount of torque delivered by the internal combustion engine towards the internal combustion engine target torque split value;
ramp an amount of torque delivered by the electric machine towards the electric machine target torque split value while retaining a total drive torque value provided to the HEV equal to the driver demanded torque;
wherein the target internal combustion engine speed is a speed greater than a speed at which the internal combustion engine would rotate with the releasable torque transmitter in the engine connected condition.

2. The system as claimed in claim 1 configured to ramp an amount of torque delivered by the internal combustion engine to become equal to the internal combustion engine target torque split value and to adjust an amount of torque delivered by the electric machine to become equal to the electric machine target torque split value once the releasable torque transmitter has assumed an engine connected condition.

3. The system as claimed in claim 1 configured to control an amount of motive torque delivered by the electric machine during a transition of the releasable torque transmitter between the engine disconnected condition and the engine connected condition such that a total drive torque delivered by the internal combustion engine and the electric machine remains equal to a value of the driver demanded torque.

4. The system as claimed in claim 1 wherein when a transition from the first mode to the second mode is required the speed control is controlled to control a speed of rotation of the internal combustion engine to approach a target speed.

5. The system as claimed in claim 4 further configured to control the internal combustion engine to maintain a speed of rotation thereof equal to a speed at which the internal combustion engine would rotate when in the engine connected condition while the releasable torque transmitter transitions from the engine disconnected condition to the engine connected condition.

6. The system as claimed in claim 1 configured to control the releasable torque transmitter to assume the engine connected condition when a speed of the internal combustion engine is substantially equal to a speed at which the internal combustion engine would rotate with the releasable torque transmitter in the engine connected condition.

7. The system as claimed in claim 1 wherein when a transition from the first mode to the second mode is required the system is configured to control a speed of rotation of the internal combustion engine by the speed control until the releasable torque transmitter is in the engine connected condition.

8. The system as claimed in claim 1 wherein an amount of torque delivered by the internal combustion engine is ramped from a value demanded by the speed control to the internal combustion engine target torque split value according to a ramp function, wherein the ramp function comprises one selected from a linear function and a non-linear function.

9. The system as claimed in claim 8 wherein the ramp function is responsive to a value of the driver demanded torque.

10. The system as claimed in claim 9 wherein the ramp function is arranged to increase a rate at which an amount of torque delivered by the internal combustion engine is ramped from the value demanded by the speed control to the internal combustion engine target torque split value responsive to a value of the driver demanded torque.

11. The system as claimed in claim 1 configured to ramp an amount of torque delivered by the internal combustion engine at a rate corresponding to a rate of change of the internal combustion engine target torque split value, a rate of change of torque delivered by the internal combustion engine being offset from that of the internal combustion engine target torque split value thereby to cause convergence of an amount of torque delivered by the internal combustion engine towards the internal combustion engine target torque split value.

12. The system as claimed in claim 1 configured to determine the internal combustion engine target torque split value and the electric machine target torque split value according to an energy management protocol based on one or more parameters of the HEV.

13. The system as claimed in claim 1 wherein the releasable torque transmitter comprises a clutch.

14. A method of controlling a hybrid electric vehicle (HEV) to deliver motive torque to drive the HEV by an internal combustion engine and an electric machine, the method comprising:

controlling the HEV to transition between:
a first mode, in which the internal combustion engine is substantially disconnected from a driveline of the HEV, and the electric machine delivers motive torque to drive the HEV, and
a second mode, in which the internal combustion engine is connected to the driveline by a releasable torque transmitter, which controls the internal combustion engine and the electric machine to deliver respective internal combustion engine target torque split value and electric machine target torque split value to drive the vehicle and thereby to provide a driver demanded drive torque, when a transition from the first mode to the second mode is required, the method comprising controlling rotation of the internal combustion engine by a speed control towards a target rotational speed and controlling the releasable torque transmitter to transition between an engine disconnected condition and an engine connected condition, thereby to connect the internal combustion engine to the driveline, the method further comprising, after the releasable torque transmitter has transitioned to the engine connected condition and the internal combustion engine is connected to the driveline, ramping an amount of torque delivered by the internal combustion engine from a value demanded by the speed control to the internal combustion engine target torque split value, and ramping an amount of torque delivered by the electric machine from a current value to the electric machine target torque split value while retaining a total drive torque value provided to drive the HEV equal to the driver demanded drive torque, whereby the target rotational speed is a speed greater than a speed at which the internal combustion engine would rotate with the releasable torque transmitter in the engine connected condition.

\* \* \* \* \*